United States Patent
McCormick

(10) Patent No.: US 11,799,548 B2
(45) Date of Patent: Oct. 24, 2023

(54) INTER-SATELLITE LINK ACQUISITION SUPPORTED BY MACHINE VISION

(71) Applicant: William Carson McCormick, Ottawa (CA)

(72) Inventor: William Carson McCormick, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 610 days.

(21) Appl. No.: 16/908,993

(22) Filed: Jun. 23, 2020

(65) Prior Publication Data

US 2021/0396888 A1    Dec. 23, 2021

(51) Int. Cl.
*H04B 10/118* (2013.01)
*G01S 17/89* (2020.01)
*G06V 10/00* (2022.01)

(52) U.S. Cl.
CPC ............ *H04B 10/118* (2013.01); *G01S 17/89* (2013.01); *G06V 10/00* (2022.01)

(58) Field of Classification Search
None
See application file for complete search history.

(56) References Cited

U.S. PATENT DOCUMENTS

| | | | |
|---|---|---|---|
| 2010/0092045 A1 | 4/2010 | Zimmer et al. | |
| 2014/0266873 A1* | 9/2014 | Pighin .................. | G01S 19/073 342/357.42 |

FOREIGN PATENT DOCUMENTS

| | | | |
|---|---|---|---|
| CN | 110166125 A | * | 6/2019 |
| CN | 110166125 A | | 8/2019 |
| EP | 0317373 A2 | | 5/1989 |
| EP | 1130809 A2 | | 9/2001 |

OTHER PUBLICATIONS

Chan, "Optical Satellite Networks", Journal of Lightwave Technology, vol. 21, No. 11, Nov. 2003, pp. 2811-2827.

Kaymak et al., "A Survey on Acquisition, Tracking, and Pointing Mechanisms for Mobile Free-Space Optical Communications," IEEE Communications Surveys & Tutorials, vol. 20, No. 2, Second quarter 2018, pp. 1104-1123.

Baister et al. "Pointing, acquisition and tracking for optical space communications", Electronics and Communication Engineering Journal, Dec. 1994, pp. 271-280.

(Continued)

*Primary Examiner* — Daniel T Tekle

(57) ABSTRACT

The present invention provides a method and apparatus used to reduce the estimated field of uncertainty of satellite positions in space. This reduced field of uncertainty estimate reduces link acquisition time of satellites as they establish inter-satellite optical links between each other. The method and apparatus reduces the estimated field of uncertainty by combining estimated field of uncertainty generated by multiple independent sources. The method further includes combining estimated field of uncertainty generated using existing field of uncertainty techniques with estimated filed of uncertainty created by a machine vision detection and location module. This machine vision detection and location module generates an estimated field of uncertainty that is a result of executing of one or more algorithms to process digital imagery data provided by a passive digital camera.

22 Claims, 6 Drawing Sheets

(56) References Cited

OTHER PUBLICATIONS

Wuchenich et al, "Laser link acquisition demonstration for the GRACE Follow-On mission", Optics Express, vol. 22, No. 9, May 5, 2014, pp. 11351-11366.
S. Y. Yu, J. Ma and L.Y. Tan, "Methods of improving acquisition probability of scanning in intersatellite optical communications," J. Optoelectronics Laser, vol. 16, pp. 57-62, 2004 (Abstract Only).
Xin et al., "Spatial acquisition optimization based on average acquisition time for intersatellite optical communications", 2010 Academic Symposium on Optoelectronics and Microelectronics Technology and 10th Chinese-Russian Symposium on Laser Physics and Laser TechnologyOptoelectronics Technology (ASOT), 2010, pp. 244-248.

\* cited by examiner

INTER-SATELLITE LINK ACQUISITION SUPPORTED BY MACHINE VISION

CROSS-REFERENCE TO RELATED APPLICATIONS

This is the first application filed for the present invention.

FIELD OF THE INVENTION

The present invention pertains to satellite-based networks, such as optical satellite mesh networks, and in particular to a method and apparatus for supporting inter-satellite link acquisition operations.

BACKGROUND

Low earth orbit (LEO) satellite constellations are being developed to provide, among other things, internet routing services. It is currently proposed that a group of satellites would be distributed in space and organized into a mesh network. Free space optical (i.e. laser) links are proposed as one way for providing high-bandwidth network connectivity between satellites. Other types of links, such as radiofrequency or microwave-based links are also possible. One of the technical issues with LEO constellations is that the inter-satellite links periodically experience signal loss due to the relative motion of the satellites in the constellation. This occurs for example when satellite orbits cross (e.g. at or near the poles), and the east-west links are swapped. Other examples occur at the seam and in the east-west links for constellations with orbits tilted away from the poles. The seam refers for example to a boundary such that, on one side of the boundary are satellites in one of two counter-rotating hemispheres or spheres, and on the other side of the boundary are satellites in the other one of the two counter-rotating hemispheres or spheres. Communication links between satellites in different ones of the two counter-rotating hemispheres cross the seam or spheres.

Reacquiring a satellite link after such a loss can be a time-consuming process. Current optical link acquisition time estimates range from 10 to 60 seconds, with relatively low success rates of 99%. Most of this link acquisition time is due to the need for spatial acquisition operations, in which communication lasers on adjacent satellites are aimed correctly at respective receivers. Link acquisition can involve complex scan/stare patterns to allow each satellite to acquire the link by mechanically directing a communication laser at a target satellite. Techniques to improve the link acquisition time are desirable because the link cannot be used to send data until link acquisition is complete.

Passive optical camera technology has matured to the point where small, reliable and high-quality passive digital cameras are readily available. Machine vision technology has also developed significantly in recent years, for example to facilitate object recognition via deep learning.

Because link acquisition times are relatively long, link outages are impactful to network operations. Therefore, there is a need for a method and apparatus for reducing link acquisition times.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for supporting inter-satellite link acquisition operations using machine vision, which refers to automatic processing of optical signals from a passive digital camera.

In accordance with embodiments of the present invention, there is provided a method for supporting inter-satellite communication link acquisition operations. The method includes the use of a passive digital camera to facilitate the link acquisition. The method includes generating, using a passive digital camera, digital imagery data representing one or more optical images of a spatial region potentially containing a target satellite. The method further includes processing, using a processor, the digital imagery data to reduce a field of uncertainty. The field of uncertainty is a subset of the spatial region in which the target satellite is expected to be located.

In some embodiments, the spatial region is selected to coincide with a region toward which a communication laser beam is directed, or a region toward which an optical receiver is directed toward for receiving a communication signal. In some further embodiments, the communication laser is aligned to the passive digital camera, and in such cases the method further includes steering the communication laser to point at the target satellite once the target satellite has been located.

In some embodiments, the optical images are generated based on light provided to the passive digital camera via a set of optical elements which are also configured to direct a communication laser beam transmitted toward the target satellite, a communication laser beam received from the target satellite, or both. In some embodiments, reducing the field of uncertainty includes identifying one or more of: a position of the target satellite; an identity of the target satellite; and a location of a communication transmitter or receiver on the target satellite. One or more of: the position of the target satellite, the identity of the target satellite, and the location of the communication transmitter may be determined using unique visual indicators associated with the target satellite. In some embodiments, reducing the field of uncertainty includes identifying a position of the target satellite, the and in such embodiments the method further includes, based on the position of the target satellite, adjusting optical elements of the satellite to steer a communication laser beam transmitted toward the target satellite, steer a communication laser beam received from the target satellite, or both.

In accordance with embodiments of the present invention, there is provided a satellite apparatus having a passive digital camera, a processor, and at least one of an optical transmitter and an optical receiver. The passive digital camera is configured to generate digital imagery information representing one or more optical images of a spatial region potentially containing a target satellite. The processor is configured to receive the generated digital imagery information and process the received digital imagery to reduce a field of uncertainty, the field of uncertainty being a subset of the spatial region in which the target satellite is expected to be located.

In some embodiments, processing of the field of uncertainty estimate is performed using a trained neural network. The trained neural network may include a deep learning network. The estimate of the field of uncertainty may include information indicative of one or more of: location of the target satellite; identity of the target satellite; location of the communication transmitter of the target satellite; and location of the communication receiver of the target satellite. In some further embodiments, the location of the target satellite, the identity of the target satellite, and the location of the communication transmitter of the target satellite and location of the communication receiver of the target satellite are determined by the processor using unique visual indicators associated with the target satellite. The unique visual indicators associated with the target satellite may include one or more of: unique visual markings; unique lighting; and unique reflections from the target satellite.

In some embodiments, the passive digital camera produces digital imagery data representing the field of uncertainty that is co-axial with the telescope. The digital imagery data may represent an estimated field of uncertainty potentially containing a target satellite. In some embodiments, the spatial region coincides with a region toward which a communication laser beam is directed, or a region toward which an optical receiver is directed toward for receiving a communication signal. The communication laser may further be aligned to the passive digital camera, and in such embodiments the apparatus is further configured to steer the communication laser to point at the target satellite once the target satellite has been located.

In some embodiments, the one or more optical images are generated based on light provided to the passive digital camera via a set of optical elements which are also configured to direct a communication laser beam transmitted toward the target satellite, a communication laser beam received from the target satellite, or both. In some embodiments, reducing the field of uncertainty includes identifying one or more of: a position of the target satellite; an identity of the target satellite; and a location of a communication transmitter or receiver on the target satellite. In some further embodiments, the position of the target satellite, the identity of the target satellite, and the location of the communication transmitter are determined using unique visual indicators associated with the target satellite. In some embodiments, reducing the field of uncertainty includes identifying a position of the target satellite, and in such embodiments the method further includes, based on the position of the target satellite, adjusting optical elements of the satellite to steer a communication laser beam transmitted toward the target satellite, steer a communication laser beam received from the target satellite, or both.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

Figure 1:
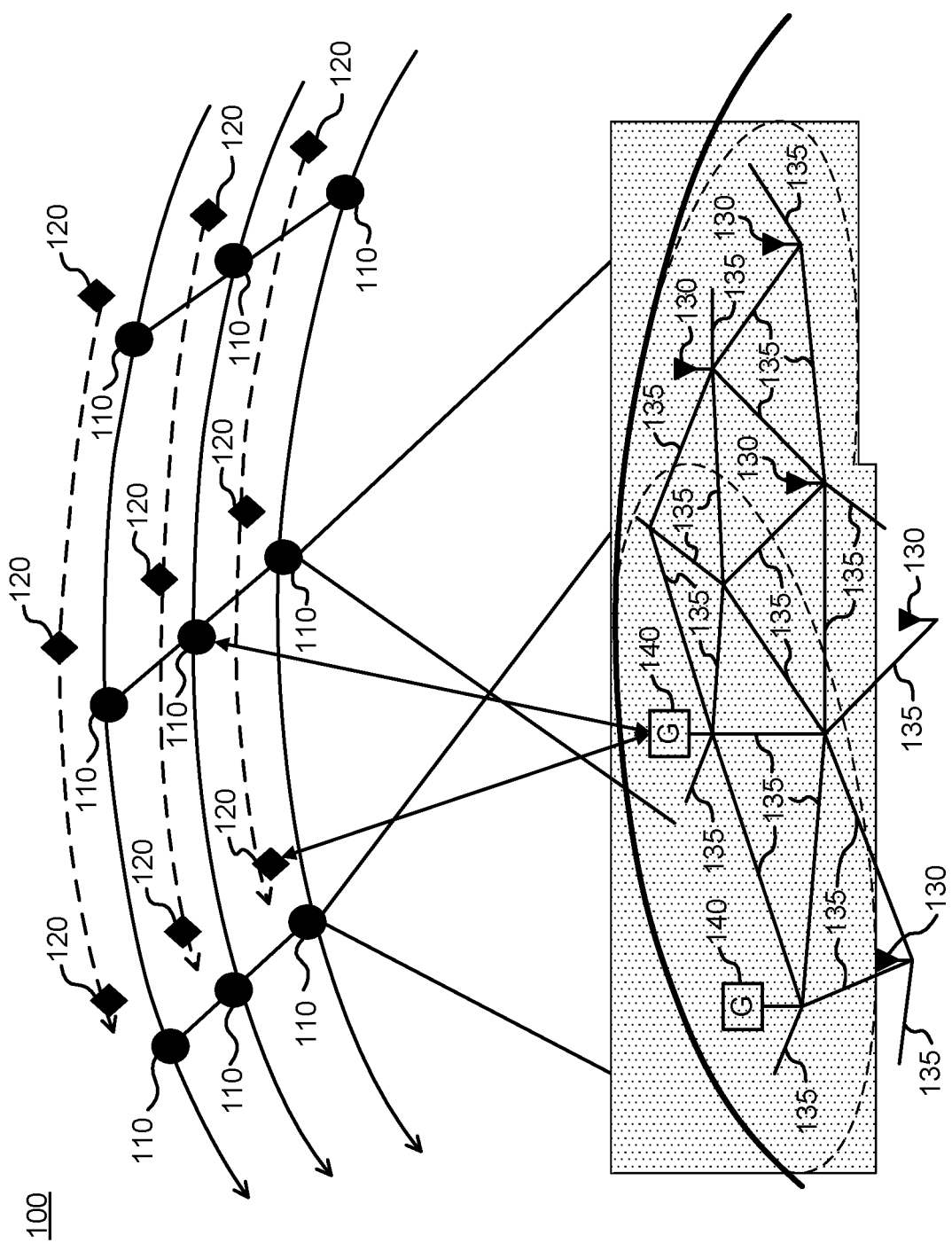
FIG. 1 illustrates an example of a satellite network integrated with a terrestrial network in accordance with embodiments of the present invention.

FIG. 1 illustrates an example of a satellite network integrated with a terrestrial network. Referring to FIG. 1, there is provided a satellite network 100 integrated with the terrestrial network. The satellite network 100 includes low earth orbit (LEO) satellites 110 and 120 in a satellite constellation. The LEO satellites 110 and 120 may be placed into different orbits. The LEO satellites 110 and 120 can communicate using inter-satellite optical links. The LEO satellites 110 and 120 are connected to terrestrial user terminals. Optical fiber 135 and wireless networks 130 interconnect with the satellites via gateways 140 forming a global heterogeneous network. Data networks based on such LEO constellation topologies illustrated in FIG. 1 can provide data networking services, especially in areas of poor or congested terrestrial infrastructure deployment.

Figure 2:
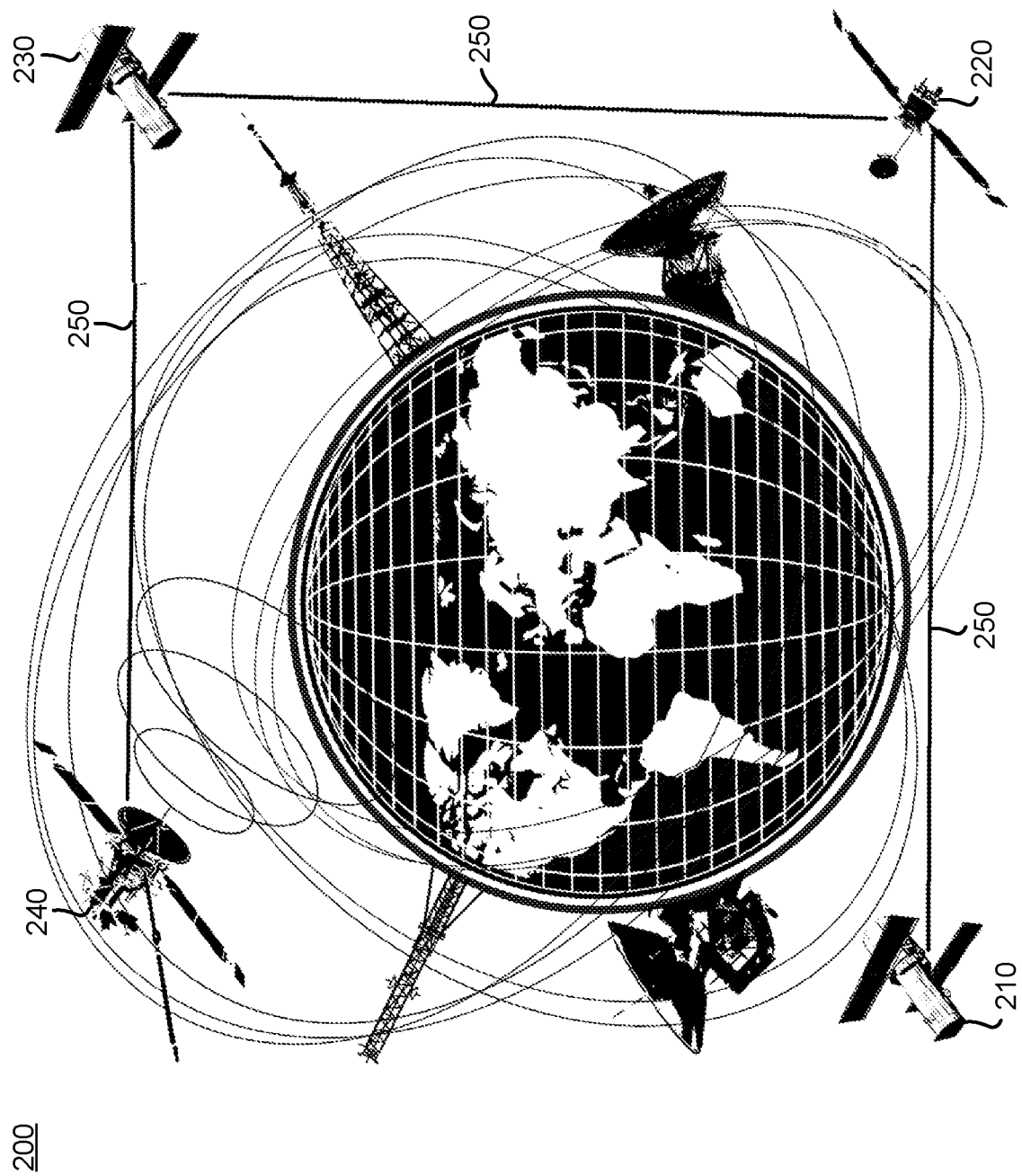
FIG. 2 illustrates an example of four satellites orbiting the Earth and communicating via inter-satellite optical links in accordance with embodiments of the present invention.

FIG. 2 illustrates four LEO satellites 210, 220, 230, and 240. Each of satellites 210, 220, 230, and 240 can communicate with another satellite using inter-satellite optical link 250. Each of satellites 210, 220, 230, and 240 include a communication laser that can perform the functions of an optical transmitter. Each of satellites 210, 220, 230, and 240 also include an associated optical transmitter and an optical receiver (not shown). The satellite transmitting information is referred to as the first satellite and the satellite receiving information is referred to as the target satellite. Those skilled in the art will appreciate that although discussion is directed to an optical link, other focused RF links could be employed in other embodiments.

Establishing inter-satellite optical link 250 using a conventional link acquisition process is typically a relatively slow process. This slow acquisition process involves the first satellite directing its communication laser toward the optical receiver of the target satellite and the target satellite directing its communication laser toward the optical receiver of the first satellite. The communication laser of the first satellite must be precisely aligned with the optical receiver on the target satellite. Because this is generally a blind alignment, it is a technical challenge. The first satellite and the target satellite steer their communication lasers through an area of space where each satellite predicts the position of the other satellite will be located. This area of space is known by those skilled in the art as a field of uncertainty.

The field of uncertainty is conventionally calculated using an open-loop process based on satellite ephemeris data. The first and target satellites, and therefore the two narrow-beam communication lasers, may be hundreds of kilometers apart. According to conventional literature and modelling, this slow acquisition process requires between 10 and 60 seconds to complete and the target success rate of this acquisition process is 99%.

According to various embodiments, the slow acquisition process includes multiple phases—coarse spatial, fine spatial, and frequency. The coarse spatial phase acquisition consumes the most time of these three phases.

The coarse spatial acquisition phase involves a combination of scan pattern and independent scan/stare cooperation. The independent scan can include a raster scan, spiral scan, Lissajous scan, or combination thereof.

Figure 3:
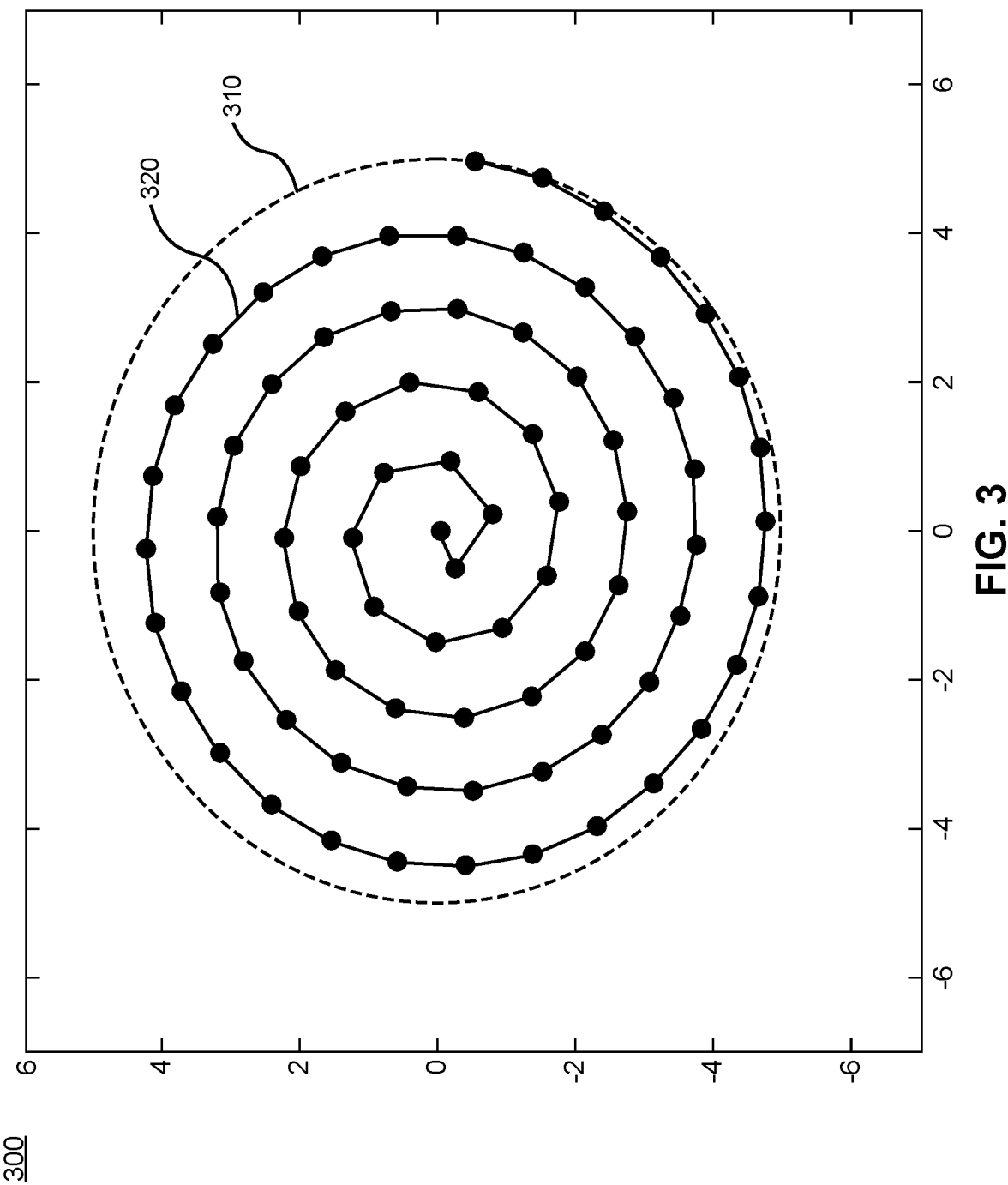
FIG. 3 illustrates an example of a field of uncertainty area and the associated spiral scan trace in accordance with embodiments of the present invention.

FIG. 3 illustrates a field of uncertainty 310 and the associated spiral scan trace 320. A search for the target satellite is performed by acquiring information for each of multiple separate angular scan positions represented by locations along the spiral scan trace 320. The larger the field of uncertainty 310, the more steps would typically be required to search for the target satellite. It should be appreciated that reducing the field of uncertainty, for example using information acquired from a machine vision system as disclosed herein, may have the effect of reducing the size of the field of uncertainty. This would have the effect of reducing the time required for the spiral scan trace to complete and therefore reduce the time required to complete the slow acquisition process.

A person skilled in the art will appreciate that estimates of target satellite location can be improved and field of uncertainty size can be reduced by combining information from multiple independent sources. For example, information obtained from machine vision processing techniques can be combined with other information such as satellite ephemeris data to estimate target satellite location within a more limited field of uncertainty. Reducing the field of uncertainty assists in satellite link acquisition operations by reducing the spatial area searched to discover the location of the target satellite, an identity of the target satellite, and a location of communication laser or receiver of the target satellite.

Embodiments of the present invention can supplement existing link acquisition techniques such as directing an optical receiver toward a field of uncertainty to receive a communication signal.

In some embodiments, the communication laser of a first satellite is directed to the optical receiver of a single target satellite and the optical receiver of a first satellite receives a laser beam from the communication laser of a single target satellite. In other embodiments the communication laser of the first satellite is directed to the optical receivers of more than one target satellite and the optical receiver of the first satellite receives multiple laser beams from multiple target satellites.

Embodiments of the present invention can be used to direct the communication laser of the satellite, including directing the beam of the communication laser after emission thereof. The beam of the communication laser can be directed by adjusting the optical elements of the satellite to steer the communication laser beam toward the target satellite. Embodiments can adjust the optical elements of the satellite to steer (within the internal optics of the first satellite) the communication laser beam received from the target satellite. Embodiments can adjust the optical elements to both steer the communication laser beam toward the target satellite, steer the communication laser beam received from the target satellite, or combination thereof.

The present invention uses a machine vision system to identify the target satellite orbiting in space. Because a target satellite may not be in the exact position indicated by an almanac or other such data source (either in absolute terms or in relation to the location of the first satellite), identifying the target satellite location can allow the first satellite to reduce the size of the search space associated with the coarse location in the first phase of a link acquisition. The first satellite can use information obtained from a passive (typically digital) camera directed towards the expected location of the target satellite. Passive cameras refer to devices which do not transmit their own light for reflection off a target object, but rely on detection of other (e.g. ambient) light either emitted by or reflected off the target object. Passive digital cameras may refer to devices which convert optical images into digital imagery indicative of light emitted from a given area. Passive digital cameras may use photosensors (e.g. charge coupled devices, or a complementary metal-oxide semiconductor sensor) providing electrical signal output which is typically digitized (discretized) and interpreted using an electronic device. The first satellite can include a communication laser used to transmit a signal to the target satellite and the target satellite can include a communication laser used to transmit a signal to the first satellite. The target satellite may or may not include a passive digital camera. The passive digital camera of the first satellite is generally aligned with the communication laser of the first satellite. The alignment allows the camera to capture an image of a spatial region in which the communication laser is directed. The target satellite can be similarly equipped.

Embodiments of the present invention can use the same optical elements that direct the beam of the communication laser to also provide optical images to the passive digital camera. As such, the passive digital camera and communication laser(s) can share common optical components. For example, the communication laser and light to be captured by the camera can pass through the same telescope element and optical elements such as beam splitters or mirrors. The communication laser and light to be captured by the camera can at a given point be split in separate directions within the optical components of the satellite.

Alternative embodiments can use a first set of optical elements to direct the beam of the communication laser, and a second, separate set of optical elements to handle light to be captured by the camera.

As the first satellite moves through its orbit, the first satellite can use the passive digital camera, and associated machine vision techniques operating on digital imagery output from the passive digital camera, to capture a number of images. These images can be processed through a machine vision processor to identify different visual indicators which can be used to identify the location of the target satellite. The visual indicators can include the visual image of the target satellite. The visual indicators can include unique markings located on the target satellite. The visual indicators can also include unique lighting employed by the target satellite, for example a particular pattern of light emitters or reflectors. These visual indicators can be used to supplement other information indicative of a predicted location of the target satellite. The information from the machine vision system can be combined with other information to identify, locate, or identify and locate a target satellite or a communication laser or receiver system thereof.

Machine vision system can operate based on one or more machine vision techniques. Examples of applicable machine vision techniques include a histogram of oriented gradients, a Hough transform, a scale invariant feature transform (SIFT), and trained neural networks, including deep learning neural networks. Machine vision system can be used to automatically detect objects in images, such as target satellites or transmitter or receiver targets located thereon, or other contextual objects indicative of a location of a target satellite, such as background objects. Machine vision systems can be used to distinguish target satellites from other objects, such as non-target satellites. Such techniques can be based on preprogrammed rules, machine learning, or a combination thereof.

Multiple machine vision techniques are often combined to provide more effective solutions. For example, an application might use edge detection to recognize object features and then use SIFT or Hough transforms to assemble the recognized features into an object.

The target satellite in embodiments of the present invention may also utilize a passive digital camera and machine vision system to determine the predicted location of the first satellite.

In various embodiments, the passive digital camera and the communication laser of the first satellite are to be sufficiently aligned so that the communication laser can be quickly and accurately steered to point at a receiver location on the target satellite once the target satellite has been located at least in part using digital imagery provided by the passive digital camera. For example, the communication laser can be steered to a region that is also substantially at the center of the digital camera image. Therefore, maintaining sufficient alignment between the passive digital camera and the communication laser reduces the time required for the first satellite to spatially acquire the target satellite.

Figure 4:
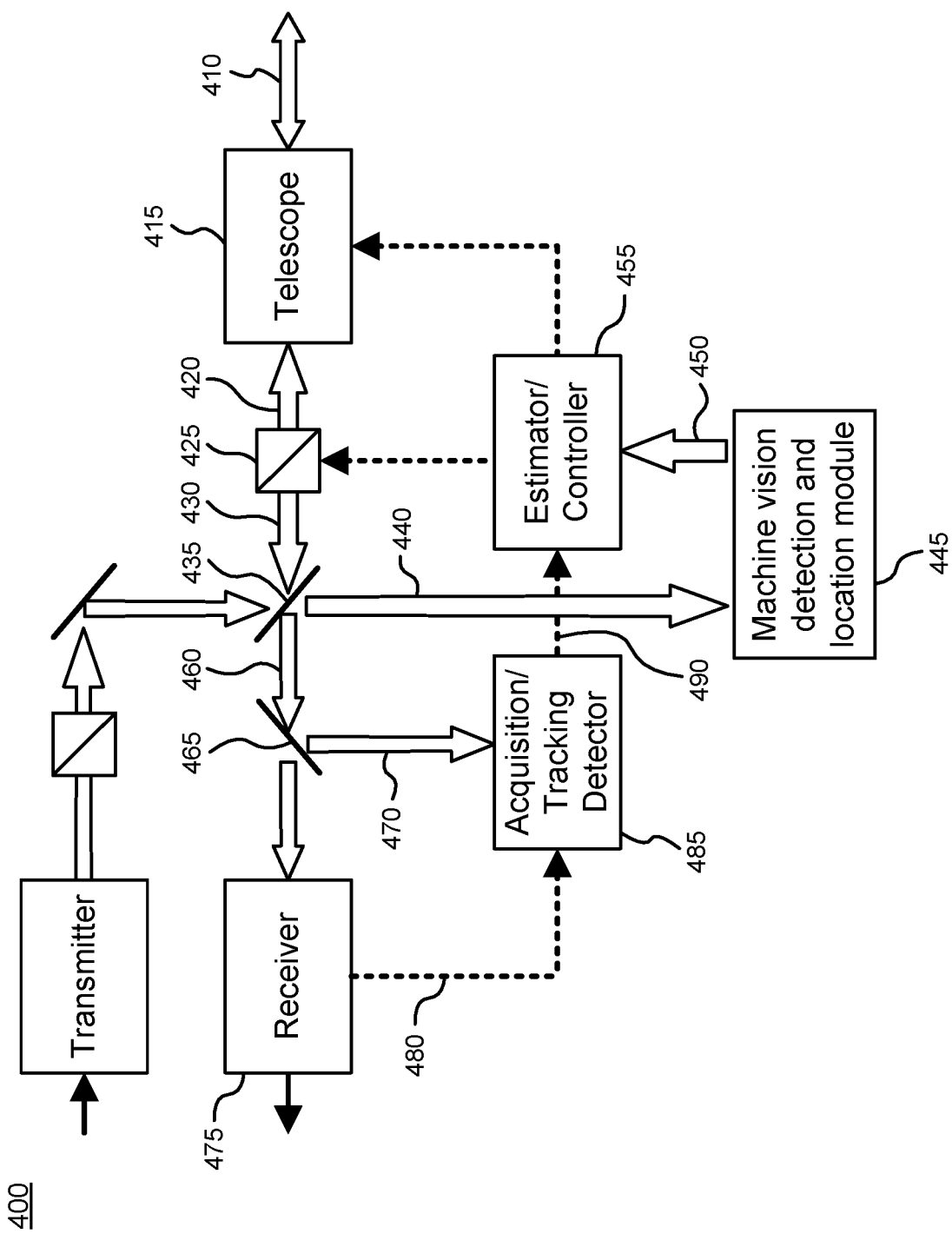
FIG. 4 illustrates an embodiment of the present invention with the Machine vision detection and location module.

Referring to FIG. 4, telescope 415 is pointed to a spatial region that potentially contains the target satellite. This spatial region contains what is known to persons skilled in the art as the field of uncertainty. Light 410, which includes an image of the field of uncertainty, enters telescope 415. Telescope 415 then outputs the image of the estimated field of uncertainty 420 to a fine steering mirror 425. Fine steering mirror 425 corrects distortions included in the image of estimated field of uncertainty 420 to produce image 430. Image 430 then strikes beam splitting mirror 435 which produces image 440 and image 460. Image 440 is applied to machine vision detection and location module 445. Machine vision detection and location module 445 processes digital imagery. This digital imagery can be produced by a passive digital camera (not shown) where the passive digital camera produces one or more digital images from image 440. The passive digital camera can be included in machine vision detection and location module 445. Digital imagery produced by the passive digital camera is co-axial with optical communications equipment, in the sense that optical communication beams associated with the optical communication equipment traverse a common axis with light being captured by the digital camera. Machine vision detection and location module 445 processes the digital imagery produced by the passive digital camera, based on machine vision techniques, to produce the estimated field of uncertainty 450, estimate the location, identity, and orientation of the target satellite, or a combination thereof.

In some embodiments, machine vision detection and location module 445 processes digital imagery produced by the passive digital camera using a deep neural network and techniques including histogram of oriented gradients, scale-invariant feature transform, and speeded up robust feature detection.

Image 460 strikes beam splitting mirror 465 to produce image 470. Acquisition/tracking detector 485 processes image 470 and signal 480, produced by receiver 475, to produce signal 490.

Estimator and controller 455 combines the estimated field of uncertainty 450 with signal 490, produced by acquisition/tracking detector 485, to improve the field of uncertainty estimate and to more quickly acquire the communication laser link. For example, the estimator and controller 455 can adjust the target scan pattern or scan area (field of uncertainty) based on the information from the machine vision detection and location module 445 at least in part in combination with ephemeris data and calculations. In some embodiments, a signal transmitted towards the target satellite by the transmitter is in a wavelength range that can be detected by the passive camera. This would allow machine vision detection and location module 445 to determine when the signal from the transmitter hits the target satellite but does not hit the receiver. This information can be used by estimation controller 455 to aid in the aiming of the communication signal transmitted to the target satellite.

In an alternate embodiment of the present invention, the passive digital camera can be a separate component of the communication laser system and can use independent optics. Independent optics can include a second telescope, separate optical elements, or combination thereof. The digital imagery produced by the passive digital camera is processed by the machine vision detection and location module 445 to produce estimated field of uncertainty 450.

Figure 5:
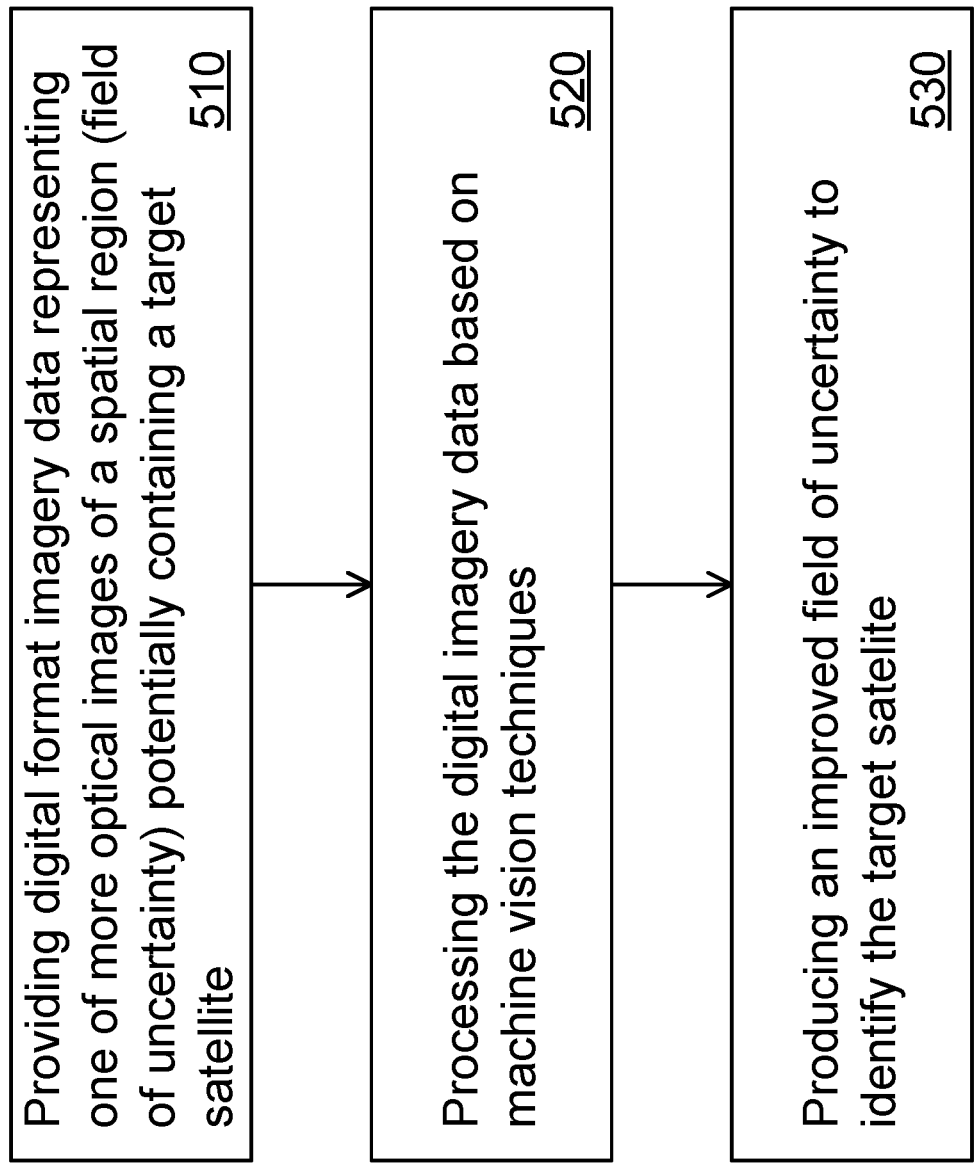
FIG. 5 illustrates a method for estimating the field of uncertainty in accordance with embodiments of the present invention.

FIG. 5 illustrates a method for estimating the spatial region potentially containing a target satellite, known to a person skilled in the art as the field of uncertainty, in accordance with embodiments of the present invention. The method illustrated by FIG. 5 may be performed by a machine vision detection and location module within one or more satellites in a satellite constellation. Referring to FIG. 5, embodiments of the present invention include a passive digital camera associated with the satellite. This passive digital camera produces digital imagery data. This digital imagery data represents one or more optical images to estimate the field of uncertainty that potentially contains target satellite 510. This imagery is produced co-axially with the optical imagery produced by the telescope on the same satellite. The machine vision detection and location module of the present invention processes 520 the digital imagery data based on machine vision techniques. This can include identifying objects in the digital image such as the target satellite or associated reference objects. The machine vision location and detection module further produces 530 an improved estimate of field of uncertainty. This can include estimating the field of uncertainty to be further analyzed to locate the target satellite. This can include identifying the target satellite within the field of uncertainty.

Figure 6:
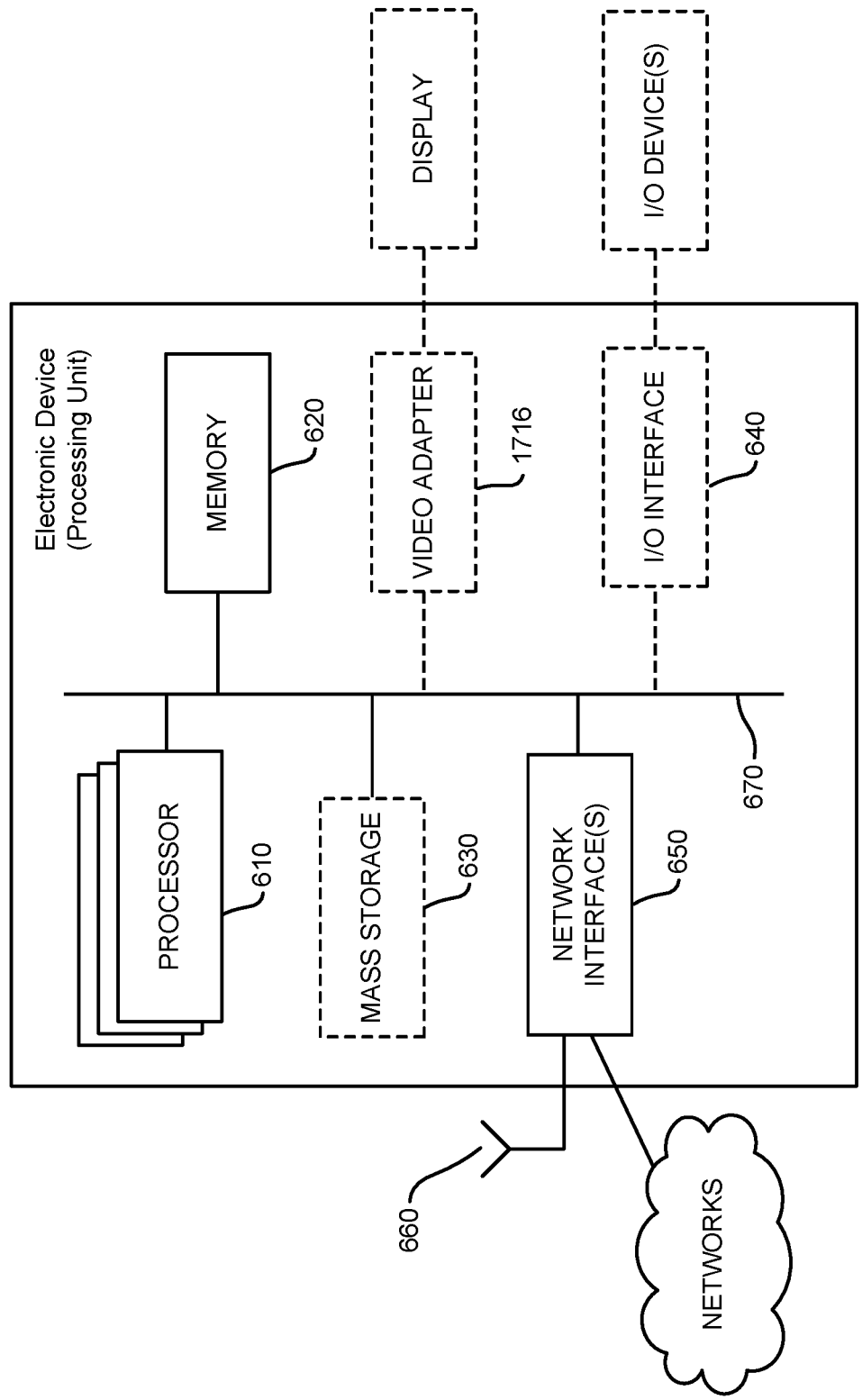
FIG. 6 illustrates, in a schematic diagram, an electronic device in accordance with embodiments of the present invention.

FIG. 6 is a schematic diagram of an electronic device 600 that may perform any or all of operations of the above methods and features explicitly or implicitly described herein, according to different embodiments of the present invention. For example, a computer equipped with network function may be configured as electronic device 600.

As shown, the device includes a processor 610, such as a Central Processing Unit (CPU) or specialized processors such as a Graphics Processing Unit (GPU) or other such processor unit, memory 620, non-transitory mass storage 630, I/O interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or any computer program product configured to store data and machine executable program code. According to certain embodiments, the memory 620 or mass storage 630 may have recorded thereon statements and instructions executable by the processor 610 for performing any of the aforementioned method operations described above.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for supporting inter-satellite communication link acquisition operations, comprising:
generating, using a passive digital camera, digital imagery data representing one or more optical images of a spatial region potentially containing a target satellite, the digital imagery data comprising spatial patterns indicative of captured light from the spatial region and indicating an image of the target satellite;
processing, using a processor, the digital imagery data to reduce a field of uncertainty, the field of uncertainty being a subset of the spatial region in which the target satellite is expected to be located, the processing performed according to machine vision operations to identify the target satellite or a portion thereof based on the spatial patterns.

2. The method of claim 1, wherein the spatial region is selected to coincide with a region toward which a communication laser beam is directed, or a region toward which an optical receiver is directed toward for receiving a communication signal.

3. The method of claim 2, wherein the communication laser is aligned to the passive digital camera, the method further comprising steering the communication laser to point at the target satellite once the target satellite has been located.

4. The method of claim 1, wherein the one or more optical images are generated based on light provided to the passive digital camera via a set of optical elements which are also configured to direct a communication laser beam transmitted toward the target satellite, a communication laser beam received from the target satellite, or both.

5. The method of claim 1, wherein reducing the field of uncertainty comprises identifying one or more of: a position of the target satellite; an identity of the target satellite; and a location of a communication transmitter or receiver on the target satellite.

6. The method of claim 5, wherein one or more of: the position of the target satellite, the identity of the target satellite, and the location of the communication transmitter are determined using unique visual indicators associated with the target satellite.

7. The method of claim 1, wherein reducing the field of uncertainty comprises identifying a position of the target satellite, the method further comprising, based on the position of the target satellite, adjusting optical elements of the satellite to steer a communication laser beam transmitted toward the target satellite, steer a communication laser beam received from the target satellite, or both.

8. A satellite apparatus comprising:
a passive digital camera configured to generate digital imagery information representing one or more optical images of a spatial region potentially containing a target satellite, the digital imagery data comprising spatial patterns indicative of captured light from the spatial region and indicating an image of the target satellite;

a processor configured to receive the generated digital imagery information and process the received digital imagery to reduce a field of uncertainty, the field of uncertainty being a subset of the spatial region in which the target satellite is expected to be located, the processing performed according to machine vision operations to identify the target satellite or a portion thereof based on the spatial patterns; and at least one of an optical transmitter and an optical receiver.

9. The apparatus of claim 8, wherein processing the field of uncertainty estimate is performed using a trained neural network.

10. The apparatus of claim 9, wherein the trained neural network includes a deep learning network.

11. The apparatus of claim 8 wherein, the optical receiver receives light from one of:
a communication laser of a single target satellite; and
communication lasers of plural target satellites.

12. The apparatus of claim 8, wherein the estimate of the field of uncertainty includes information indicative of one or more of:
location of the target satellite;
identity of the target satellite;
location of the communication transmitter of the target satellite; and
location of the communication receiver of the target satellite.

13. The apparatus of claim 12, wherein one or more of: the location of the target satellite, the identity of the target satellite, and the location of the communication transmitter of the target satellite and location of the communication receiver of the target satellite are determined by the processor using unique visual indicators associated with target satellite.

14. The apparatus of claim 13, wherein the unique visual indicators associated with the target satellite include:
unique visual markings;
unique lighting; and
unique reflections from the target satellite.

15. The apparatus of claim 8, wherein the passive digital camera produces digital imagery data representing the field of uncertainty that is co-axial with the telescope.

16. The apparatus of claim 8, wherein the digital imagery data represents an estimated field of uncertainty potentially containing a target satellite.

17. The apparatus of claim 8, wherein the spatial region coincides with a region toward which a communication laser beam is directed, or a region toward which an optical receiver is directed toward for receiving a communication signal.

18. The apparatus of claim 17, wherein the communication laser is aligned to the passive digital camera, the apparatus further configured to steer the communication laser to point at the target satellite once the target satellite has been located.

19. The apparatus of claim 8, wherein the one or more optical images are generated based on light provided to the passive digital camera via a set of optical elements which are also configured to direct a communication laser beam transmitted toward the target satellite, a communication laser beam received from the target satellite, or both.

20. The apparatus of claim 8, wherein reducing the field of uncertainty comprises identifying one or more of: a position of the target satellite; an identity of the target satellite; and a location of a communication transmitter or receiver on the target satellite.

21. The apparatus of claim 20, wherein one or more of: the position of the target satellite, the identity of the target satellite, and the location of the communication transmitter are determined using unique visual indicators associated with the target satellite.

22. The apparatus of claim 8, wherein reducing the field of uncertainty comprises identifying a position of the target satellite, the method further comprising, based on the position of the target satellite, adjusting optical elements of the satellite to steer a communication laser beam transmitted toward the target satellite, steer a communication laser beam received from the target satellite, or both.

* * * * *